(12) United States Patent
Schimel

(10) Patent No.: US 7,133,298 B2
(45) Date of Patent: Nov. 7, 2006

(54) HIGH FREQUENCY VOLTAGE REGULATING TRANSFORMER BASED CONVERTER

(75) Inventor: Paul Louis Schimel, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 131 days.

(21) Appl. No.: 10/972,881

(22) Filed: Oct. 25, 2004

(65) Prior Publication Data

US 2006/0087299 A1  Apr. 27, 2006

(51) Int. Cl.
*H02J 1/00* (2006.01)
*H02M 3/355* (2006.01)
*H02M 7/68* (2006.01)
*G05F 3/04* (2006.01)

(52) U.S. Cl. .......................... 363/15; 363/16; 363/91; 363/22; 323/305

(58) Field of Classification Search ................ 363/16, 363/21.02, 15, 22, 81; 323/306, 305
See application file for complete search history.

(56) References Cited

U.S. PATENT DOCUMENTS

| | | | |
|---|---|---|---|
| 4,565,958 A | 1/1986 | Cooper | |
| 4,587,604 A | 5/1986 | Nerone | |
| 4,973,876 A | 11/1990 | Roberts | |
| 5,066,900 A * | 11/1991 | Bassett | 323/224 |
| 5,159,541 A * | 10/1992 | Jain | 363/26 |
| 5,414,341 A | 5/1995 | Brown | |
| 5,438,243 A * | 8/1995 | Kong | 315/219 |
| 5,600,547 A * | 2/1997 | Kim | 363/22 |
| 5,621,621 A * | 4/1997 | Lilliestrale | 363/17 |
| 5,675,491 A * | 10/1997 | Kijima | 363/133 |
| 5,781,418 A * | 7/1998 | Chang et al. | 363/16 |
| 5,894,412 A | 4/1999 | Faulk | |
| 5,939,830 A * | 8/1999 | Praiswater | 315/169.3 |
| 6,266,254 B1 * | 7/2001 | Ohtake | 363/22 |
| 6,344,979 B1 * | 2/2002 | Huang et al. | 363/16 |
| 6,628,093 B1 * | 9/2003 | Stevens | 315/291 |
| 6,633,138 B1 | 10/2003 | Shannon et al. | |
| 6,667,585 B1 * | 12/2003 | O'Meara | 315/291 |
| 6,804,129 B1 * | 10/2004 | Lin | 363/98 |

\* cited by examiner

*Primary Examiner*—Karl Easthom
*Assistant Examiner*—Harry R Behm
(74) *Attorney, Agent, or Firm*—Warren L. Franz; W. James Brady, III; Frederick J. Telecky, Jr.

(57) ABSTRACT

A switching regulator and method of fabricating a switching regulator is disclosed. In one embodiment a switching regulator comprises a transformer having a primary winding and a secondary winding, an inductor (L) connected to an input of the primary winding, and a capacitor (C) connected across the primary winding of the transformer. The inductor and capacitor form a L-C tank circuit. The switching regulator also includes a frequency source connected to the inductor, wherein the frequency source provides a switching frequency to the inductor that is substantially equal to a resonant frequency of the L-C tank circuit.

18 Claims, 4 Drawing Sheets

HIGH FREQUENCY VOLTAGE REGULATING TRANSFORMER BASED CONVERTER

TECHNICAL FIELD

The present invention relates to electrical circuits and more particularly to direct current (DC) to direct current (DC) power conversion and regulation.

BACKGROUND

Power converters typically serve to accept energy from an unregulated energy source, such as a voltage source, and derive therefrom a regulated voltage which is applied to a load circuit. The regulation function is performed by interposing a voltage regulator device between the source of energy and the load circuit. One such type of voltage regulator is known as a switching regulator or switching power supply. These devices employ switching devices that operate in either a fully on state or a fully off state. The switching device is periodically turned on for a time interval to permit energy transfer around the various elements of the power train for purposes of maintaining the voltage output at a predetermined level. The device is then periodically turned off to allow the energy to decay into the load. A feedback signal from the output of the regulator is fed back to a control circuit. The control circuit utilizes the feedback signal to continuously adjust the duty cycle and/or frequency of the control signal driving the power switches in responses to variations in the output load and input voltage, and as a result, regulating the output voltage.

Typically, the power switches are turned on and off at a frequency which varies with the application and given size, cooling, power output, temperature and efficiency constraints. In certain applications, it may be required that the output signal is electrically isolated from the input signal, for example, via a transformer. In these applications, it will be required that the feedback signal be electrically isolated from the control circuit. Therefore, the switching regulator will require DC feedback components that work across said isolation boundary such as opto-isolators or additional signal transformers that add cost and complexity to the switching regulator.

SUMMARY

One aspect of the present invention relates to a switching regulator. The switching regulator comprises a transformer having a primary winding and a secondary winding, an inductor connected to an input of the primary winding, and a capacitor connected across the primary winding of the transformer. The inductor and capacitor form a L-C tank circuit. The switching regulator also includes a frequency source driving switch elements connected to the inductor, wherein the frequency source provides a switching frequency to the inductor that is substantially equal to a resonant frequency of the L-C tank circuit.

Another aspect of the invention relates to a voltage regulating transformer based converter. The converter comprises a transformer having a primary winding with an overwinding and a secondary winding, an inductor connected to an input of the primary winding, and a capacitor connected across the primary winding of the transformer. The inductor and capacitor form a L-C tank circuit. The converter also comprises a phase locked loop (PLL) device connected to the switch elements which are connected to the inductor, wherein the PLL provides a switching frequency to the inductor that is substantially equal to a resonant frequency of the L-C tank circuit. Additionally, the overwinding provides voltage gain to a change in voltage of the tank circuit to enhance saturation of the transformer such that a clipped sine wave voltage is provided to the secondary winding of the transformer. By this, any input perturbation is minimized at the secondary.

Another aspect of the invention relates to a method for fabricating a switching regulator. The method comprises fabricating an integrated inductor-transformer assembly having a primary winding, a secondary winding and an inductor connected between the primary winding and an input terminal. A tank capacitor is connected across the primary winding of the transformer wherein the inductor and capacitor form a L-C tank circuit. A frequency source is connected to the inductor, wherein the frequency source provides a switching frequency to the inductor that is substantially equal to a resonant frequency of the L-C tank circuit. The methodology includes sweeping the frequency source along a range of frequencies about the resonant frequency, while measuring a response voltage of the tank circuit, and setting the frequency of the frequency source at a frequency that corresponds to a maximum peak response voltage of the tank circuit.

DETAILED DESCRIPTION

The present invention relates to a switching power supply or regulator that provides a regulated output voltage from an unregulated input voltage without the need of a feedback signal from an output voltage to compensate for variations in input voltage and output load. In one aspect of the invention, the switching power supply is a transformer-based converter that employs an inductor-capacitor (L-C) resonant tank circuit to transfer energy from an input voltage source to an electrically isolated load. A frequency source (e.g., a phase locked loop (PLL)) provides a switching frequency to the L-C tank circuit that is substantially equal to the resonant frequency of the L-C tank circuit. Therefore, regulation is controlled by the switching frequency of the converter as opposed to the DC feedback of the output signal. This eliminates the need to crossover the electrical isolation boundary with a voltage representative signal associated with the output signal.

Regulation is achieved by selecting a transformer that saturates at a volt-time product that is less than the volt-time product provided by the tank circuit. This operation appears as a clipped sine wave at the secondary. Additionally, regulation can be improved further by providing a transformer with an overwinding that provides additional gain to the tank circuit, since the Q value (Quality Factor or Figure of Merit) of the tank circuit is proportional to the voltage across the capacitor of the tank circuit. The Q value of a resonator is a measure of quality of the resonator, such that the lower the dissipation the higher the Q value of the resonator.

Figure 1:
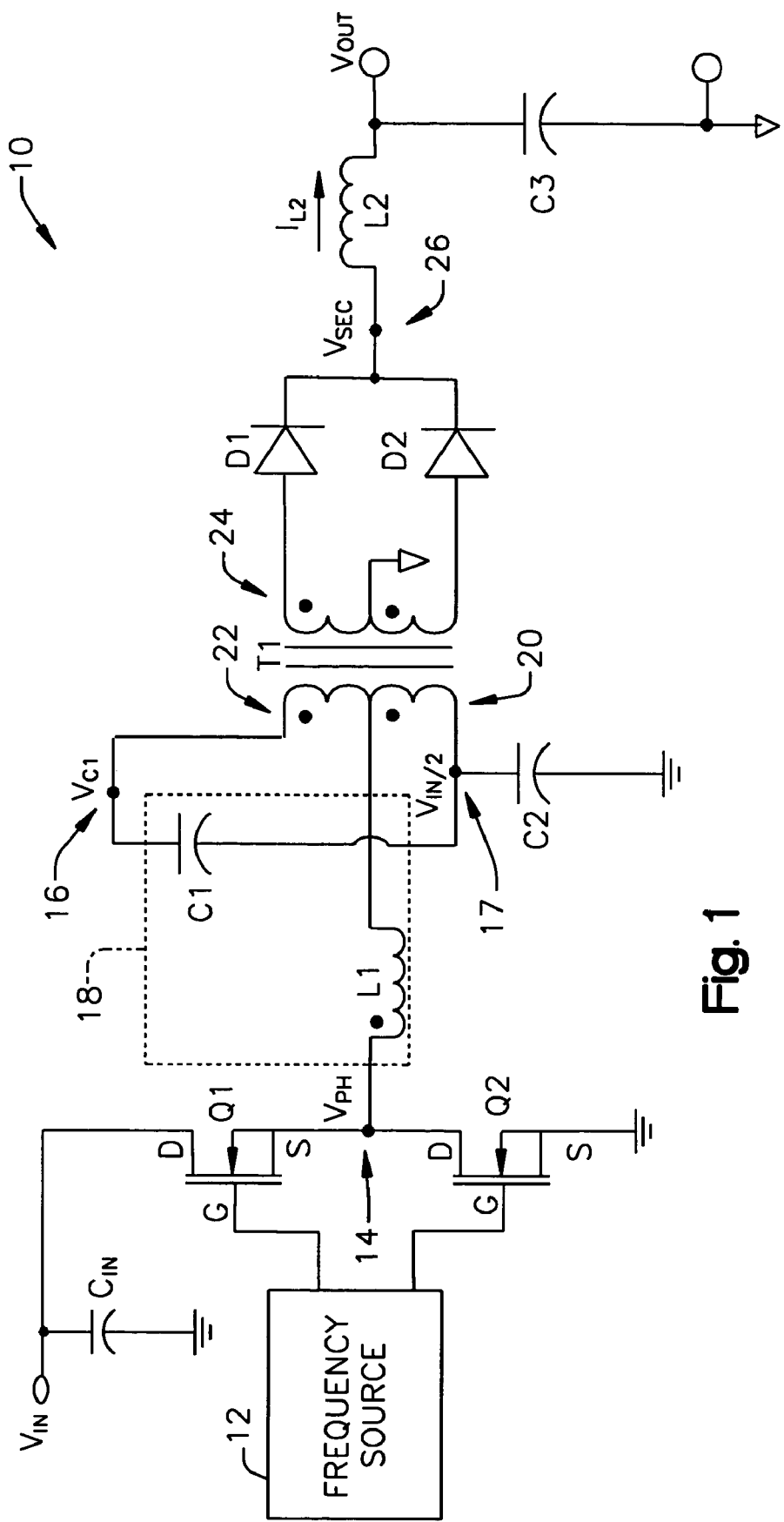
FIG. 1 illustrates a schematic diagram of a switching regulator in accordance with an aspect of the invention.

FIG. 1 illustrates a switching regulator 10 in accordance with an aspect of the present invention. The switching regulator 10 can be, for example, a half bridge based converter. The present invention can be employed with most bi-directional, voltage fed power topologies including but not limited to, full bridge, phase shifted full bridge and push pull. The switching regulator 10 includes a frequency source 12 that is operative to provide a first control pulse to a first power switch Q1 and a second control pulse to a second power switch Q2. The first control pulse and the second control pulse can oscillate at the same frequency at 180° out of phase. The first power switch Q1 is connected to an unregulated input voltage ($V_{IN}$) at its drain terminal and a node 14 at its source terminal. The second power switch Q2 is connected to its drain terminal at the node 14 and to a first ground (GND1) at its source terminal. An input capacitor $C_{IN}$ is connected between the unregulated input voltage ($V_{IN}$) and the first ground (GND1). The frequency source 12 is operative to run each switch Q1 and Q2 at approximately 50% duty cycle with a little deadtime between transitions to avoid cross conduction.

The node 14 is connected to first end of an inductor L1, with the second end of the inductor L1 being connected to an input terminal of a transformer T1. Switching of the first end of the inductor L1 between $V_{IN}$ and ground cause the inductor L1 to provide the energy to charge a first capacitor C1 through an overwinding winding 22, and provides the energy to charge a second capacitor C2 through a primary winding 20. The overwinding 22 is another winding that is closely magnetically coupled to the primary winding to add additional winding turns to the primary winding 20. The first inductor L1 and the first capacitor C1 form an L-C tank circuit 18. The second capacitor C2 charges to a voltage of $V_{IN}/2$ at a node 17 due to the symmetry of the first and second control pulse. The second capacitor holds the return side of the primary winding 20 of the transformer T1 at a voltage $V_{IN}/2$. The second capacitor C2 and the input capacitor $C_{IN}$ can be selected to be substantially large. By this, load transitions, input voltage variations and surge currents do not change the voltage of the second capacitor C2 and the input capacitor $C_{IN}$ The primary winding 20 and the overwinding 22 are magnetically coupled to a secondary winding 24 of the transformer T1. A first end of the secondary winding 24 is connected to an anode of a diode D1 and a second end (return side) of the secondary winding 24 is connected to an anode of a diode D2. The cathodes of the diodes D1 and D2 are connected to a first end of an output inductor L2. A second end of the output inductor L2 is connected to a third capacitor C3. The capacitor C3 is connected between an output voltage $V_{OUT}$ and a second ground (GND2) that is electrically isolated from the first ground (GND1).

The L-C tank circuit 18 is selected to have a resonant frequency that is substantially equal to a switching frequency of the frequency source 12. The switching frequency of the frequency source 12 should be substantially constant. The overwinding 22 on the transformer primary allows the energy stored in L1 to ring C1 to a higher voltage, thus achieving a higher Q resonant tank circuit 18, than can be achieved by simply connecting C1 to L1. For example, for an arbitrary L1 and C1 pair, energy is exchanged in a resonant fashion between L1 and C1. During exchange of the $LI^2/2$ component of L1 to C1, the overwinding 22 amplifies the voltage and reduces the current into C2 proportionally, such that the impedance $Z_{C1}$ of the capacitor C1 as seen by the inductor L1 is:

$$Z_{C1}=1/j\omega C1 * ((N_{OVERWIND}+N_{PRIMARY})/N_{OVERWIND})^2 \qquad \text{EQ. 1}$$

where $N_{OVERWIND}$ is the number of winding turns of the overwinding 22 and $N_{PRIMARY}$ is the number of winding turns of the primary 20. Therefore, without the overwinding 22 the impedance of the capacitor C1 as seen by the inductor L1 is simply:

$$Z_{C1}=1/j\omega C1 \qquad \text{EQ. 2}$$

Additionally, if we review the Quality factor or Figure of Merit Q for nonzero overwinding, it follows that:

$$Q=Q * ((N_{OVERWIND}+N_{PRIMARY})/N_{OVERWIND})^2 \qquad \text{EQ. 3}$$

such that the higher the Q of the resonant circuit, the more constant the flux excursions will be resulting in a more constant output voltage and thus a regulated output voltage without the use of feedback. The upper limit on Q will be governed in practice by practical voltage limits on the capacitor C1, creepage and clearance distance requirements across the windings and interwinding capacitance. Additionally, L1 can be sized to allow safe operation into shorted secondary conditions, such that $$Z_{MIN}=j\omega L1 \qquad \text{EQ. 4}$$

The transformer T1 can be designed in such a way as to saturate at some volt-time product less than the maximum volt-time product developed across C1. Therefore, as long as there is enough energy in L1, the primary waveform will be a clipped sine wave. Additionally, the transformer T1 can operate safely, while being driven in and out of saturation. L1 should be selected to be substantially larger than the leakage inductance of the primary 20 of the transformer T1 to mitigate any parasitic interactions caused by the transformer T1. Additionally, L1 should have substantially constant inductance over line, load and temperature. L1 can also serve to limit the current into T1 under short circuit conditions at the secondary, thus limiting the maximum current drawn by the regulator 10 to a safe value.

As the load (not shown) on the output of the regulator 10 increases, more current is drawn through L1. This stores more energy in L1, which drives more energy into the transformer T1 and the load (not shown) into C1. The higher energy in C1 sustains the clipped sine waveform across the primary 20 and the secondary 24, while the remaining current couples into the secondary 24 and flows to the load. As a result of the L-C tank circuit 18 having a resonant frequency that is substantially equal to a switching frequency of the frequency source 12, and the constant clipped sine waveform provided to the secondary 24. The clipped sine waveform is rectified and filtered to provide a regulated output voltage ($V_{OUT}$).

Figure 2:
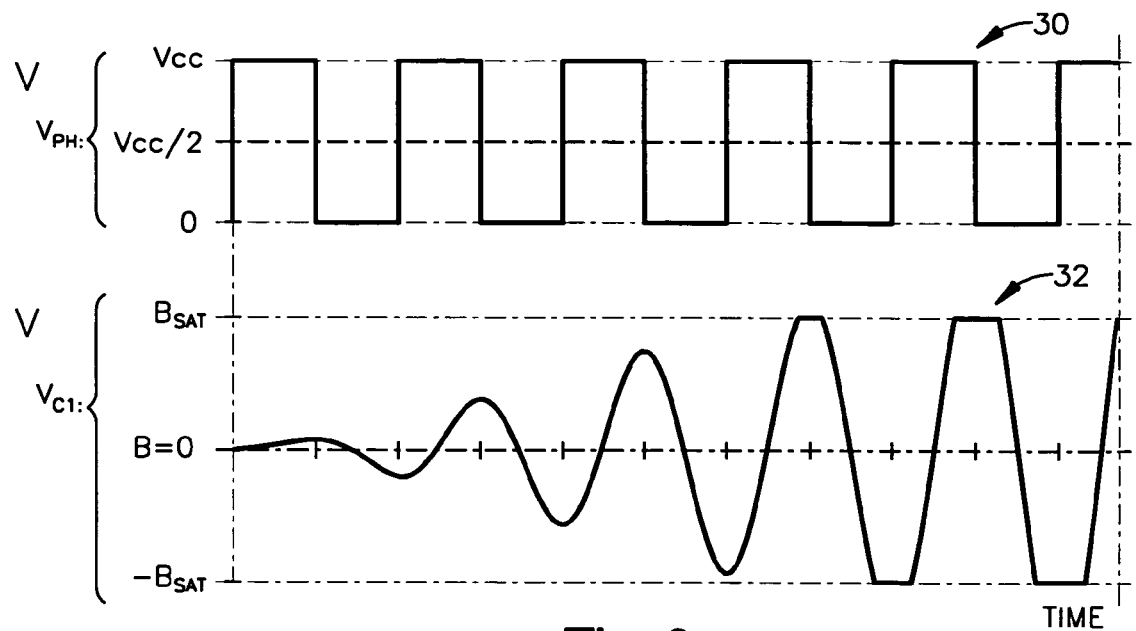
FIG. 2 illustrates voltage waveforms at an input of an inductor and at an output of capacitor of an L-C tank circuit at initialization of the voltage regulator of FIG. 1.
Figure 3:
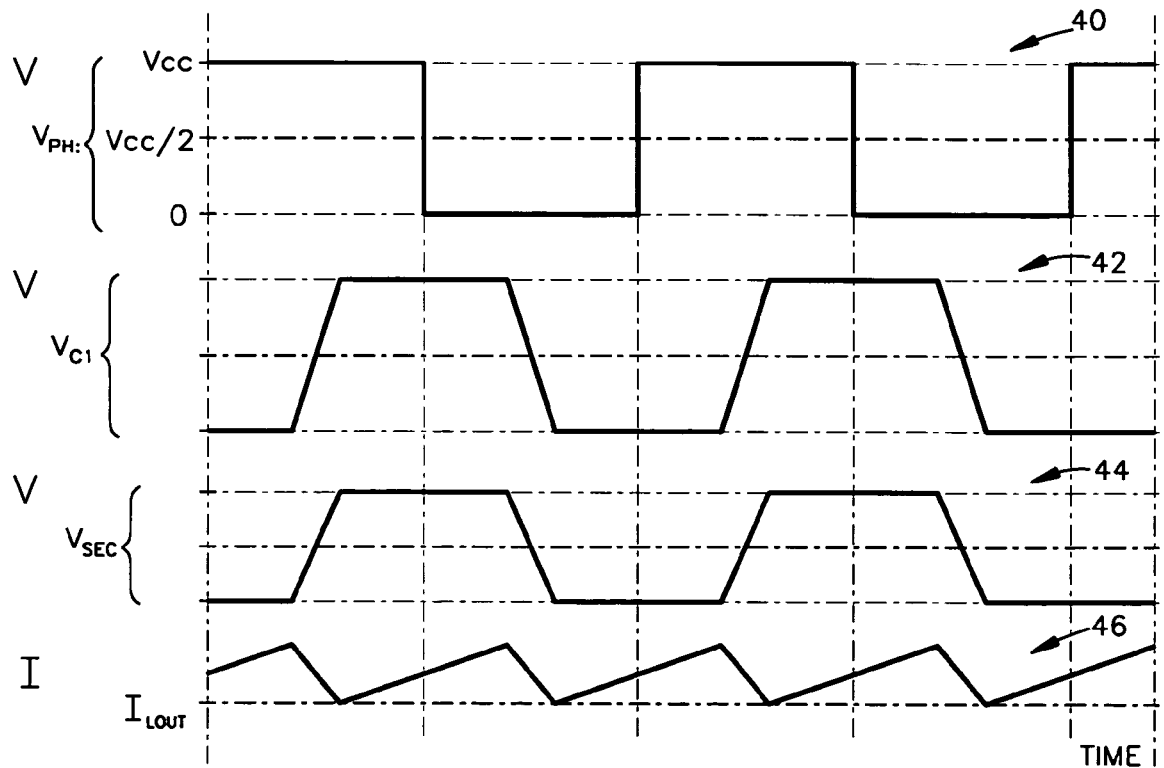
FIG. 3 illustrates voltage waveforms at steady state conditions at various nodes of the voltage regulator of FIG. 1.

FIG. 2 illustrates voltage waveforms at an input of inductor L1 and at an output of capacitor C1 at initialization of the voltage regulator 10. A first voltage waveform ($V_{PH}$) 30 is provided at the node 14. The first voltage waveform 30 is a square wave that oscillates between $V_{IN}$ and the first ground (GND1) having a frequency substantially equal to the resonant frequency of the LC tank circuit 18. A second voltage waveform ($V_{C1}$) 32 illustrate the voltage response at the node 16 coupled to the output of the capacitor C1. As illustrated in FIG. 3, the capacitor voltage grows exponentially over time from an initial peak magnetic field (B) state of B=0 to a final peak state of $B=B_{SAT}$, such that the peak amplitude voltage of the capacitor C1 exceeds the saturation state of the transformer T1. Therefore, after initialization, the voltage waveform provided to an input of the transformer is a clipped sinewave having a frequency substantially equal to the resonant frequency of the LC tank circuit 18.

FIG. 3 illustrates steady state voltage waveforms after initialization of the voltage regulator 10. A first voltage waveform ($V_{PH}$) 40 is provided at the node 14. The first voltage waveform 40 is a square wave that oscillates between $V_{IN}$ and the first ground (GND1) having a frequency substantially equal to the resonant frequency of the LC tank circuit 18. A second voltage waveform ($V_{C1}$) 32 illustrate the voltage response at the node 16 connected to the output of the capacitor C1. The second voltage waveform 42 at steady state is a clipped sinewave having a frequency substantially equal to the resonant frequency of the LC tank circuit 18. The clipped sinewave of the second voltage waveform is provided to the primary 20 and overwinding 22 of the transformer T1. A resultant voltage waveform (VSEC) 44 is provided at the secondary 24 of the transformer T1 at node 26. A current waveform 46 illustrates a current $I_{L2}$ through the output inductor L2 in response to the resultant voltage waveform 44.

Figure 4:
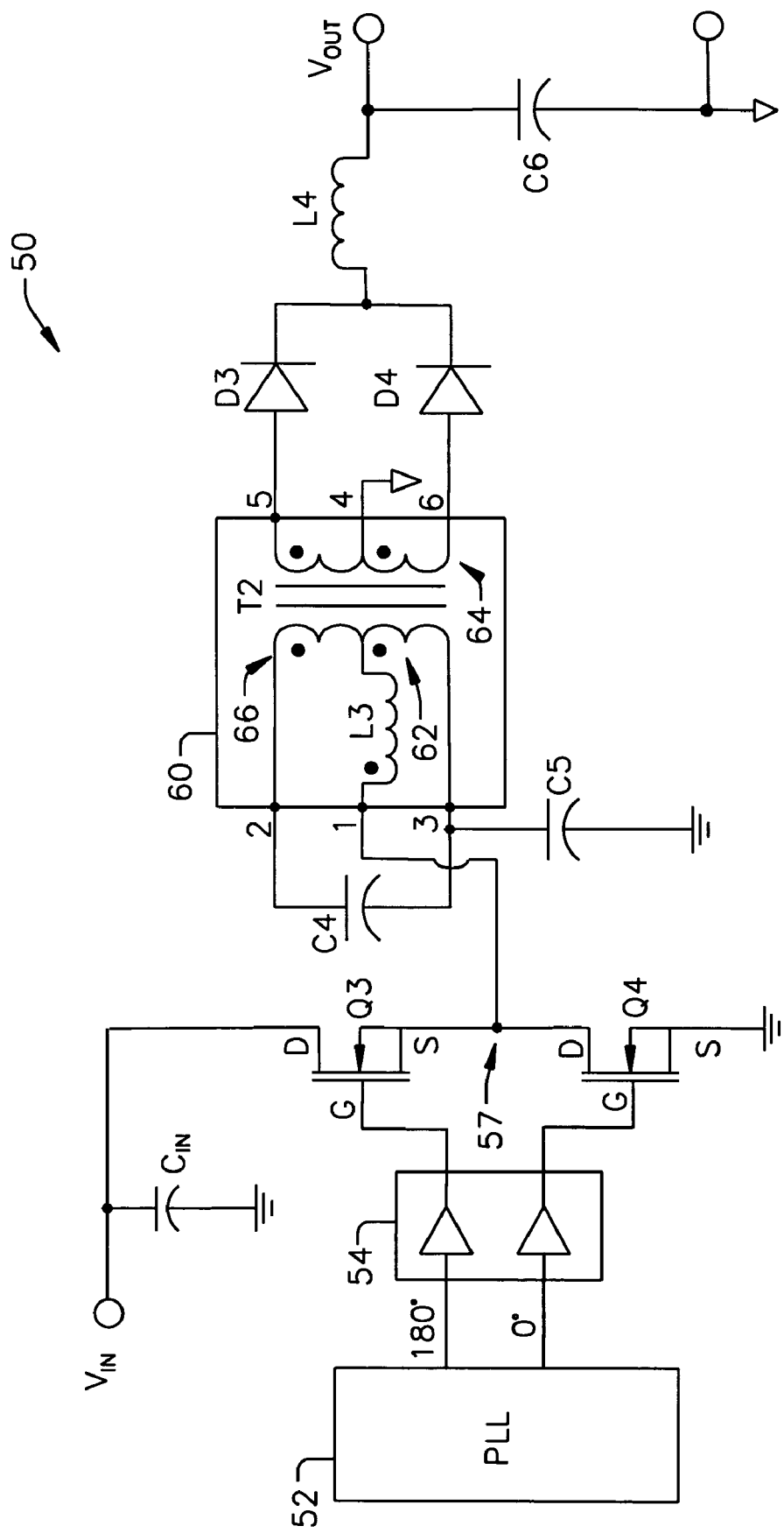
FIG. 4 illustrates a schematic diagram of a switching regulator in accordance with another aspect of the invention.

FIG. 4 illustrates a switching regulator 50 in accordance with another aspect of the present invention. The switching regulator 50 can be, for example, a half bridge based converter. The present invention can be employed with most bi-directional, voltage fed power topologies including but not limited to, full bridge, phase shifted full bridge and push pull. The switching regulator 50 includes a phase locked loop (PLL) frequency source 52 that is operative to provide a first control pulse to a first power switch Q3 and a second control pulse to a second power switch Q4 through a buffer 54. The first power switch Q3 is connected to an unregulated input voltage ($V_{IN}$) at its drain terminal and a node 57 at its source terminal. The second power switch Q4 is connected to its drain terminal at the node 57 and to a first ground at its source terminal. An input capacitor $C_{IN}$ is connected between the unregulated input voltage ($V_{IN}$) and the first ground (GND1). The first control pulse is phased at 180° with respect to the second control pulse, which is phased at 0°. Therefore, the PLL frequency source 52 is operative to run each switch Q3 and Q4 at approximately 50% duty cycle.

The node 57 is connected to an integrated inductor-transformer assembly 40. The integrated inductor-transformer assembly 60 includes an inductor L3 having a first end connected to a primary winding 62 and an overwinding 66, and a second end connected at a first input terminal (1) of the integrated inductor-transformer assembly 60. An end of the overwinding 66 is connected to a second input terminal (2) and an end of the primary winding 62 is connected to a third input terminal (3). A secondary winding 64 of the integrated inductor-transformer assembly 60 includes a first output terminal (4) connected to a center tap of the secondary winding 64, a second output terminal (5) connected to a first end of the secondary winding 64 and a third output terminal (6) connected to a second end of the secondary winding 64. The primary winding 62, the overwinding 66 and the secondary winding 64 form a transformer T2. The second output terminal (5) is connected to an anode of a diode D3 and the third output terminal (6) is connected to an anode of diode D4. The cathode of the diodes D3 and D4 are connected to a first end of an output inductor L4, and a second end of the output inductor L4 is connected to a capacitor C6. The capacitor C6 is connected between an output voltage ($V_{OUT}$) and a second ground (GND2) that is electrically isolated from the first ground (GND1).

The integrated inductor-transformer assembly 60 provides for an integrated solution to providing a regulated output voltage by connecting an accurate frequency source 52 to the first input terminal (1) and a tank capacitor C4 across the second input terminal (2) and the third input terminal (3) of the integrated inductor-transformer assembly 60. The tank capacitor C4 is selected such that the resonant frequency of the tank capacitor C4 and the inductor L3 is substantially equal to the switching frequency of the PLL 52. Additionally, a number of rectification techniques can be employed at the first and second output terminals (5, 6) to provide a regulated output without employing feedback.

For the present realization, a capacitor C5 can be connected from the third input terminal to the first ground (GND1). The capacitor C5 charges to a voltage of $V_{IN}/2$ due to the symmetry of the first and second control pulse. The capacitor C5 holds the return side of the primary winding 62 of the integrated inductor-transformer assembly 60 at a voltage $V_{IN}/2$. The capacitor C5 can be selected to be substantially large so that load transitions and surge currents do not change the voltage of the capacitor C5.

The inductor L3 provides the energy to charge the tank capacitor C4 through the overwinding 66 of the primary 62 of the integrated inductor-transformer assembly 60. The overwinding 66 on the transformer primary 62 allows the energy stored in L3 to ring C4 to a higher voltage, thus achieving a higher Q resonant tank circuit, than can be achieved by simply connecting C4 to L3. The transformer T2 of the integrated inductor-transformer assembly 60 can be designed in such a way as to saturate at some volt-time product less than the maximum volt-time product developed across C4. Therefore, the primary waveform will be a clipped sine wave. The clipped sine waveform is rectified and filtered at the secondary to provide a regulated output voltage without feedback.

Figure 5:
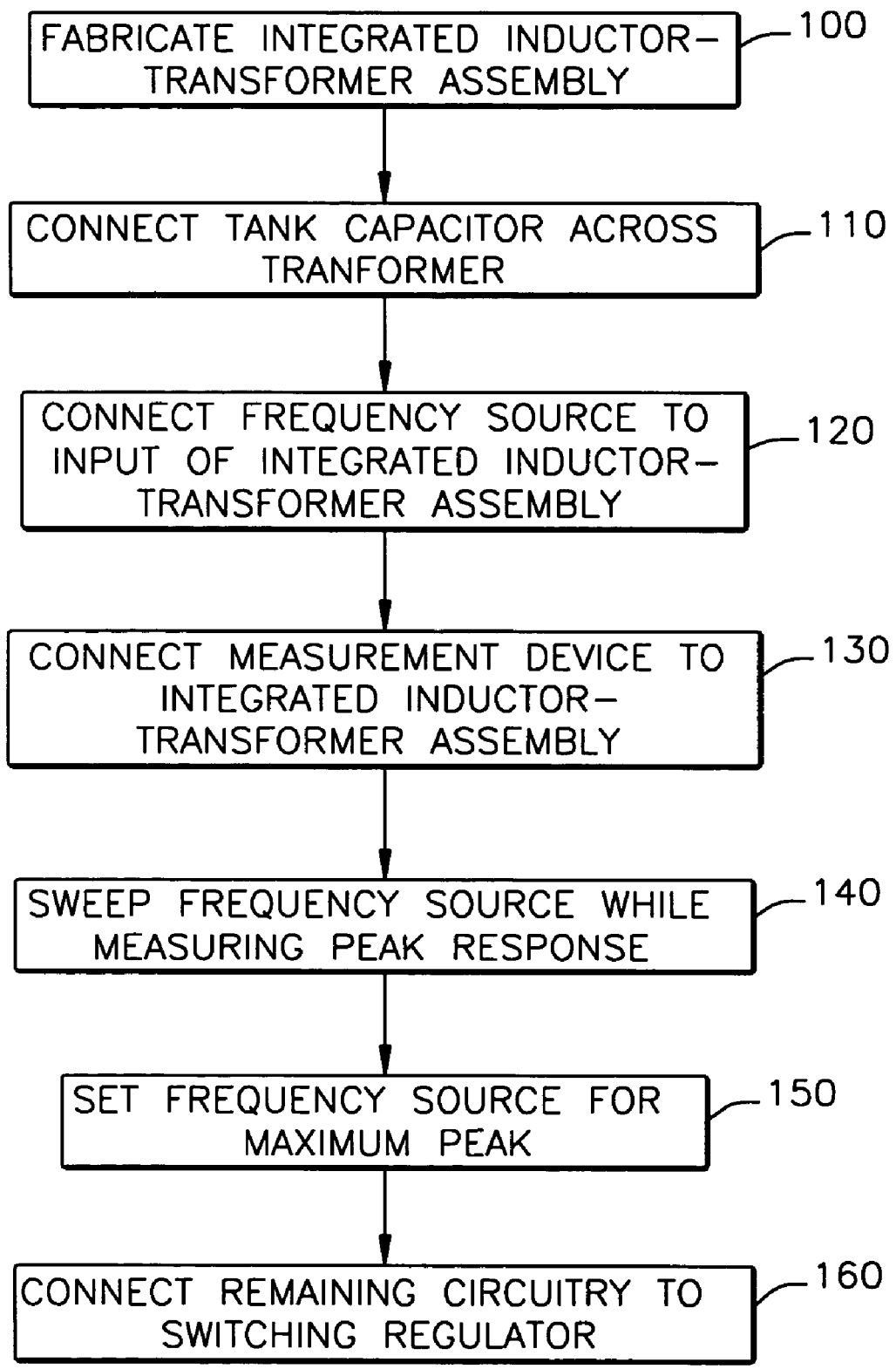
FIG. 5 illustrates a methodology for fabricating a switching regulator in accordance with an aspect of the invention.

In view of the examples shown and described above, a methodology in accordance with the present invention will be better appreciated with reference to FIG. 5. While, for purposes of simplicity of explanation, a methodology is shown and described as executing serially, it is to be understood and appreciated that the methodology is not limited by the order shown, as some aspects may, in accordance with the present invention, occur in different orders and/or concurrently from that shown and described herein. Moreover, not all features shown or described may be needed to implement a methodology in accordance with the present invention. Additionally, such methodology can be implemented in hardware (e.g., one or more integrated circuits), software (e.g., running on a DSP or ASIC) or a combination of hardware and software.

FIG. 5 illustrates a methodology for fabricating a switching regulator without feedback in accordance with an aspect of the present invention. The methodology begins at 100 where an integrated inductor-transformer assembly is fabricated. The integrated inductor-transformer assembly can include a tank inductor with a first end connected between a primary winding and an overwinding of the primary winding. A second end of the tank inductor can be connected to an input of the integrated inductor-transformer assembly. The methodology then proceeds to 110. At 110, a tank capacitor is connected across input terminals of the integrated inductor-transformer assembly. The input terminal can include a first input connected to the overwinding and a second input connected to a return side of a primary winding. The methodology then proceeds to 120.

At 120, a frequency source (e.g., a PLL) is connected to the second end of the inductor through the input of the integrated inductor-transformer assembly. At 130, a measurement device (e.g., voltage measurement) is connected to the integrated inductor-transformer assembly. For example, the input device can be connected to the overwinding end of the integrated inductor-transformer assembly, or the secondary winding of the integrated inductor-transformer assembly. The measurement device is operative to measure the peak response of the tank circuit formed by the tank inductor and the tank capacitor. The methodology then proceeds to 140.

At 140, sweeping of the frequency of the frequency source is performed, while measuring the peak response of the tank circuit. The frequency range of the frequency sweep can be, for example, within +/−10% of the resonant frequency of the tank circuit. The sweeping of the frequencies is performed to accommodate for manufacturing variations of the integrated inductor-transformer assembly. At 150, the frequency source is set at a frequency that corresponds to a maximum peak response of the tank circuit. At 160, the remaining circuitry is connected to the switching regulator. The remaining circuitry can include coupling capacitors, rectifier circuitry and switching devices.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A switching regulator comprising:
   a transformer having a primary winding and a secondary winding;
   an inductor (L) connected to an input of the primary winding;
   a capacitor (C) connected across the primary winding of the transformer, the inductor and capacitor forming a L-C tank circuit; and
   a frequency source connected to the inductor, wherein the frequency source provides a switching frequency to the inductor that is substantially equal to a resonant frequency of the L-C tank circuit;
   wherein the transformer is operative to saturate at a volt-time product that is less than a response volt-time product of the tank circuit, such that a clipped sine wave voltage is provided to the secondary winding of the transformer to provide a regulated output voltage without feedback.

2. The switching regulator of claim 1, wherein the frequency source is a phase locked loop (PLL) device.

3. The switching regulator of claim 1, wherein the inductor and the transformer are fabricated as an integrated inductor-transformer assembly.

4. The switching regulator of claim 1, further comprising an overwinding connected to the primary winding of the transformer, wherein the overwinding provides gain to a response voltage of the L-C tank circuit.

5. The switching regulator of claim 4, wherein a quality factor (Q) of the L-C tank circuit is increased as a result of the overwinding.

6. The switching regulator of claim 1, further comprising a first power switch and a second power switch connected to the inductor at first ends, the first power switch being connected to an unregulated input voltage and the second power switch being connected to ground at second ends, wherein the frequency source provides a first control pulse to switch the first power switch and a second control pulse to switch the second power switch.

7. The switching regulator of claim 6, wherein the first control pulse is 180° out of phase with the second control pulse.

8. The switching regulator of claim 1, further comprising a rectifier circuit coupled to the secondary winding of the transformer.

9. A voltage regulating transformer based converter comprising:
   a transformer having a primary winding with an overwinding and a secondary winding;
   an inductor (L) coupled to an input of the primary winding;
   a capacitor (C) coupled across the primary winding of the transformer, the inductor and capacitor forming a L-C tank circuit; and
   a phase locked loop (PLL) device connected to the inductor, wherein the PLL provides a switching frequency to the inductor that is substantially equal to a resonant frequency of the L-C tank circuit and the overwinding provides gain to a response voltage of the tank circuit to facilitate saturation of the transformer at a volt-time product that is less than a response volt-time product of the tank circuit, such that a clipped sine wave voltage is provided to the secondary winding of the transformer.

10. The converter of claim 9, wherein the inductor and the transformer are fabricated as an integrated inductor-transformer assembly.

11. The converter of claim 9, wherein a quality factor (Q) of the L-C tank circuit is increased as a result of the overwinding.

12. The converter of claim 9, further comprising a first power switch and a second power switch connected to the inductor at first ends, the first power switch being connected to an unregulated input voltage and the second power switch being connected to ground at second ends, wherein the PLL provides a first control pulse to switch the first power switch and a second control pulse to switch the second power switch.

13. The converter of claim 12, wherein the first control pulse is 180° out of phase with the second control pulse.

14. The converter of claim 9, further comprising a rectifier circuit connected to the secondary winding of the transformer.

15. A method for fabricating a switching regulator, the method comprising:
   fabricating an integrated inductor-transformer assembly having a primary winding, a secondary winding and an inductor (L) connected between the primary winding and an input terminal;
   connecting a tank capacitor (C) across the primary winding of the transformer, the inductor and capacitor forming a L-C tank circuit;
   connecting a frequency source to the inductor, wherein the frequency source provides a switching frequency to the inductor that is substantially equal to a resonant frequency of the L-C tank circuit;

sweeping the frequency source along a range of frequencies about the resonant frequency while measuring a response voltage of the L-C tank circuit; and setting the frequency of the frequency source at a frequency that corresponds to a maximum peak response voltage of the L-C tank circuit;

wherein the fabricating an integrated inductor-transformer assembly comprising fabricating a transformer portion that is operative to saturate at a volt-time product that is less than a response volt-time product of the tank circuit, such that a clipped sine wave voltage is provided to the secondary winding of the transformer to provide a regulated output voltage without feedback.

16. The method of claim 15, wherein the frequency source is a phase locked loop (PLL) device.

17. A method for fabricating a switching regulator, the method comprising;

fabricating an integrated inductor-transformer assembly having a primary winding, a secondary winding and an inductor (L) connected between the primary winding and an input terminal;

connecting a tank capacitor (C) across the primary winding of the transformer, the inductor and capacitor forming a L-C tank circuit;

connecting a frequency source to the inductor, wherein the frequency source provides a switching frequency to the inductor that is substantially equal to a resonant frequency of the L-C tank circuit;

sweeping the frequency source along a range of frequencies about the resonant frequency while measuring a response voltage of the L-C tank circuit; and setting the frequency of the frequency source at a frequency that corresponds to a maximum peak response voltage of the L-C tank circuit;

wherein the fabricating an integrated inductor-transformer assembly comprising fabricating an overwinding coupled to the primary winding of the transformer portion, wherein the overwinding provides gain to a response voltage of the L-C tank circuit and a quality factor (Q) of the L-C tank circuit is increased as a result of the overwinding.

18. The method of claim 15, further comprising connecting a rectifier circuit to the secondary winding of the transformer.

* * * * *